United States Patent [19]

Gruters

[11] Patent Number: 5,051,928
[45] Date of Patent: Sep. 24, 1991

[54] COLOR CORRECTION FOR VIDEO GRAPHICS SYSTEM

[75] Inventor: Michael S. Gruters, East Moriches, N.Y.

[73] Assignee: Dubner Computer Systems, Inc., Paramus, N.J.

[21] Appl. No.: 138,170

[22] Filed: Dec. 28, 1987

[51] Int. Cl.⁵ .............................................. G06F 3/14
[52] U.S. Cl. .................................... 364/521; 340/703
[58] Field of Search ................... 364/521, 526; 358/80, 358/78, 75, 22, 311, 314; 340/701, 703

[56] References Cited

U.S. PATENT DOCUMENTS

| | | | |
|---|---|---|---|
| Re. 32,544 | 11/1987 | Korman | 358/28 |
| 4,096,523 | 6/1978 | Bedlmares-Sarabia et al. | 358/80 |
| 4,488,245 | 12/1984 | Dalke et al. | 364/526 |
| 4,511,989 | 4/1985 | Sakamoto | 358/80 X |
| 4,654,720 | 3/1987 | Tozawa | 358/80 X |
| 4,689,669 | 8/1987 | Hoshino et al. | 358/80 |
| 4,694,329 | 9/1987 | Belmares-Sarabia et al. | 358/22 |
| 4,710,800 | 12/1987 | Fearing et al. | 358/22 |
| 4,754,488 | 6/1988 | Lyke | 358/80 X |
| 4,763,186 | 8/1988 | Belmares-Sarabia et al. | 358/22 |
| 4,771,275 | 9/1988 | Sanders | 340/701 X |

Primary Examiner—David L. Clark
Attorney, Agent, or Firm—Francis I. Gray; John Smith-Hill

[57] ABSTRACT

A color correction method for a video graphics system defines a region of color space within which target objects to be corrected lie. The region is defined automatically by positioning a target box within a representative portion of a target object within a video picture and computing from the pixels within the target box a range of color parameters which include the target object. A desired color for the target object is selected, and all pixels which are both within the video picture or a selected portion thereof and also within the defined region of color space are changed accordingly. Anti-aliasing is provided by scanning an area surrounding each pixel to determine the number pixels within the area which are within the defined region, and changing the color of each pixel according to the ratio of the number of pixels which lie within the defined region and the total number of pixels within the area.

11 Claims, 4 Drawing Sheets

COLOR CORRECTION FOR VIDEO GRAPHICS SYSTEM

BACKGROUND OF THE INVENTION

The present invention relates to video graphics systems, and more particularly to color correction of isolated objects in video graphics systems such as video paint and animation systems.

Color correction systems have evolved with the desire to convert motion picture films into video signals which may be stored on video tape for subsequent television broadcasting using a "film chain." The color correction is desired so that the colors on a television monitor appear to be the same as those in the original color motion picture film, or so that black and white motion picture films may be colorized for home television viewing. There are color correction systems that provide not only for scene-by-scene color correction, but also for objects within a scene. Such object color correction systems store a video frame of data from a video tape in a "still" store. A physical area within the video frame is defined which encompasses the object to be color corrected. An operator manually adjusts hue, saturation and/or luminance to define a region in color space which encompasses the object, the region being defined by observing the video monitor to see when either the object or the background surrounding the object achieves a uniform grey color. Once the region is defined and set, the operator can manually adjust hue, saturation and luminance and only those objects which fall within the defined physical area and the defined color region are affected. Once the color of the object is corrected, the new scene is transferred to an output video tape.

In computerized video manipulation systems such as video paint and animation systems there also exists a desire to provide color correction, or more appropriately color altering, of objects to achieve desired special effects.

SUMMARY OF THE INVENTION

Accordingly the present invention provides a color corrector for video graphics systems which alters the color of isolated objects in a video scene. First a target object is defined in terms of its digitized color components by positioning a target box within the target object which encompasses a representative sample of the color range of the target object. The pixels within the box are converted into digital components of hue, saturation and luminance, and the ranges of the values for the digital components are determined and extended a predetermined amount to define a target region of color space. Then each pixel in a selected area of the video scene which encompasses the target object is converted into digital components of hue, saturation and luminance. Each pixel is compared with the saved hue, saturation and luminance ranges and, if there is a "hit", i.e., the pixel lies within the target color space, the color of the pixel is corrected to a desired color. For blending at the edges of the target object a small area surrounding the pixel to be corrected is scanned and the number of "hits" determined as a percentage of the small area. The color of the pixel is corrected according to the percentage of hits and the color difference between the desired color and the original color of the pixel.

The objects, advantages and other novel features of the present invention will be apparent from the following detailed description when read in conjunction with the appended claims and attached drawing.

DESCRIPTION OF THE PREFERRED EMBODIMENT

Figure 1:
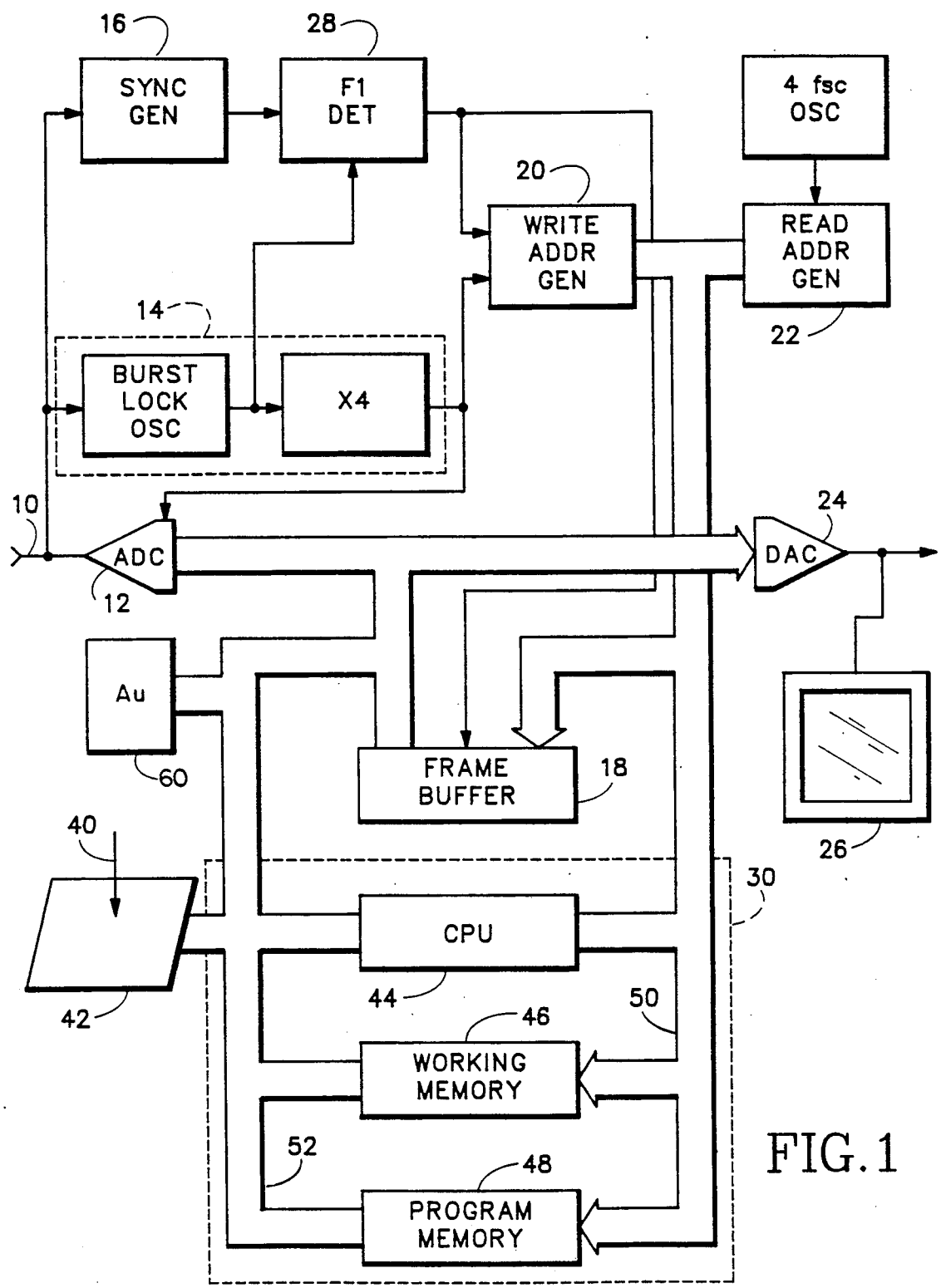
FIG. 1 is a block diagram of a typical video graphics system using the color correction technique of the present invention.

Referring now to FIG. 1 a television graphics system is shown, such as that described in U.S. Pat. No. 4,707,731 entitled "Encoded Video Television Graphics System" issued to John M. Ghazey on Nov. 17, 1987, having a terminal 10 to which a composite video signal is input. The incoming video signal is applied to an analog to digital converter (ADC) 12 which digitizes the video signal, to a clock generator 14 which generates clock pulses at four times subcarrier frequency, and to a sync generator 16 which generates vertical pulse trains that are locked to horizontal sync. An output signal from the clock generator 14 at subcarrier frequency and the vertical pulse trains are applied to a field one detector 28 to generate a write enable signal at the beginning of a video frame. The clock pulses from the clock generator 14 control the sampling of the video signal by the ADC 12 and increment a write address counter 20 which is reset by the write enable signal at the beginning of each video frame. The digitized video signal from the ADC 12 is input to a frame buffer 18 at the addresses determined by the digital words output from the word address generator so that the frame buffer contains a complete frame of video data (four fields for NTSC) in the form of video pixels having $Y-U$, $Y-V$, $Y+U$ and $Y+V$ values. The input video signal may be derived from any video source, such as video tape, video camera, computer generated or the like.

Modification of the video frame representing a picture to be color corrected or changed in some manner is carried out using a computer 30 having a central processing unit (CPU) 44, a working memory 46 and a program memory 48. The computer 30 communicates with the frame buffer 18 via an address bus 50 and a data bus 52 to write data into and read data from the frame buffer. An operator interacts with the computer in any conventional manner, such as a position transducer having a stylus 40 and a data tablet 42, to display on a monitor 26 a pointer designating a corresponding point of the picture. To display the picture the contents of the frame buffer 18 are read out sequentially under control of a read address counter 22 and converted to analog form by a digital to analog converter (DAC) 24. The resulting analog signal is displayed on the monitor 26. An arithmetic unit 60 connected to the data bus 52 is used by the computer 30 to decode pixels to be modified from the frame buffer 18, to change the values for the decoded pixels, and to encode the modified pixels prior to storage back into the frame buffer.

A color correct menu has five color correction functions: hue, saturation, luminance, contrast and combination. The hue function changes only hue; the saturation function changes only saturation; the luminance function changes only luminance; the contrast function changes only contrast; and the combination function changes combinations of hue, saturation, luminance and contrast.

Each change function may be applied in three general ways: target OFF, target ON and target RANGE. Target OFF results in all the pixels in the image or within a user defined box being corrected equally by a specified amount. Target ON results in all the pixels in the image or within a user defined box being corrected proportionally to a preselected target color, the pixels having respective color components equal to the target color components being corrected by 100 percent of a specified amount, the pixels having color components with the greatest deviation from the target color being unchanged, and all other pixels being corrected proportionally to the deviation of their color component from the target color. Target RANGE results in all pixels in the image or within a user defined box being changed by a specified amount if the pixels are within the preselected color space defined by a hue range, a saturation range and a luminance range, except that pixels near the edge of a target object within the defined color space are blended as a function of the distance from the edge and the color deviation from the mean target color.

Figure 2:
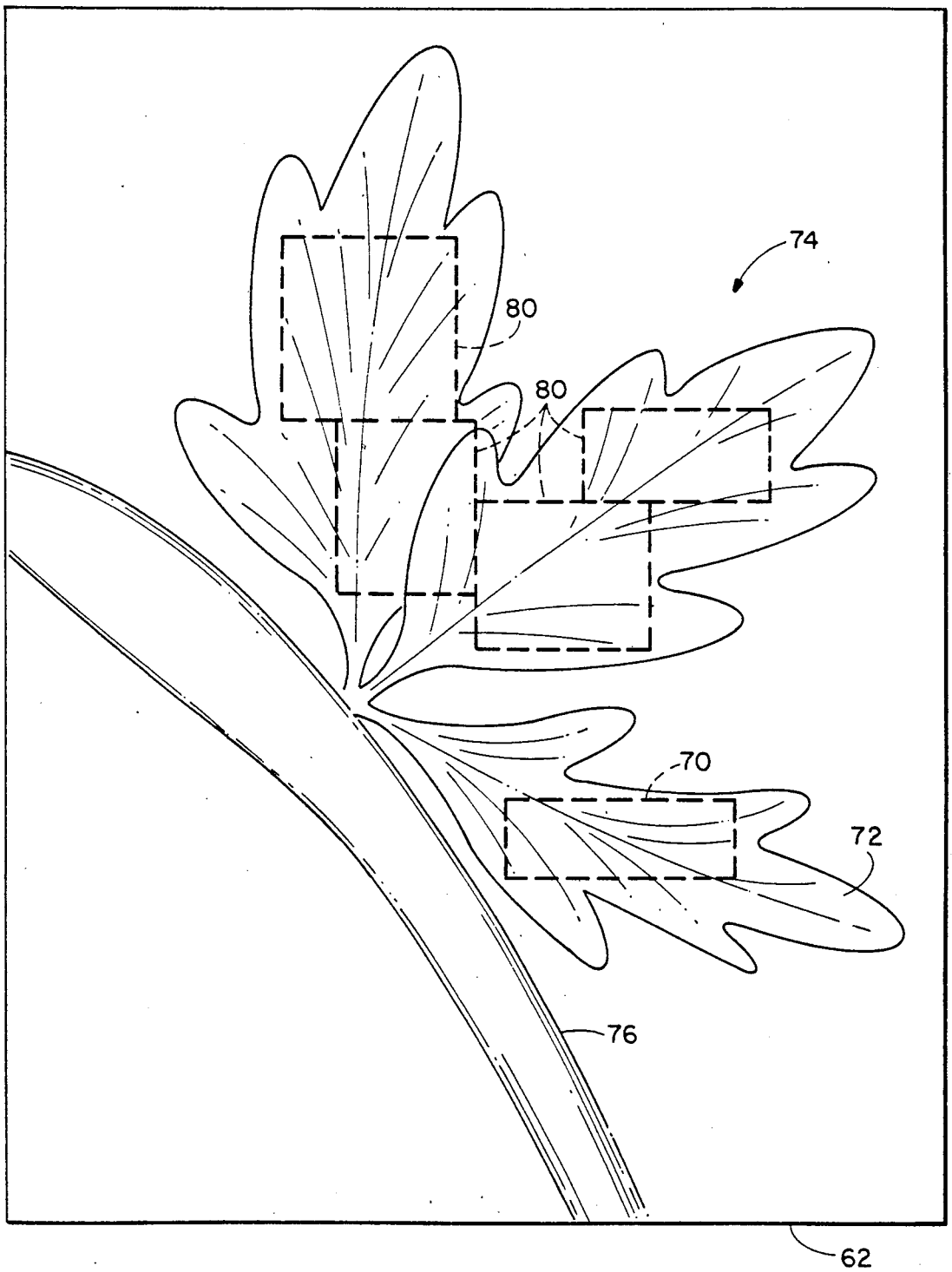
FIG. 2 is a graphic view of a video scene for which color correction according to the present invention is desired.

The first step in the color correction process is to define a target object to be color corrected in terms of its digitized color components. For target RANGE, as illustrated in FIG. 2, this is accomplished automatically by positioning a target box 70 within the target object, such as a leaf 72 of leaves 74 on a tree 76. The target box 70 is positioned to encompass a representative portion of the target object which substantially defines the color range of the target object. The pixels within the positioned target box are converted from their encoded composite value to components of hue, saturation and luminance. The hue, saturation and luminance limits found within the target box are determined, saved and expanded by a predetermined amount, such as fifteen percent, to provide a hue range, a saturation range and a luminance range which are displayed on the monitor 26 by a suitable means, such as a palette display, for further operator manipulation. Other target boxes 80 may be positioned within the target object and used to extend these ranges.

The next step is to determine which pixels in the video scene or user defined box 62 are in the target object defined color space, and then to color correct them. Each pixel in the picture 62 is converted to color components of hue, saturation and luminance. The color components are compared to the respective ranges defining the color space of the target object. If all the color components are within the defined color space, then the color is corrected to a desired color as specified by the operator. Alternatively to determine whether a pixel is within the defined color space an area around the pixel is scanned, such as a three by three pixel matrix. For each pixel of the matrix a determination is made as to whether the pixel is within the defined color space, and the number of "hits" is counted. The ratio of hits within the scanned area is used as a comparison with a threshold value for target object detection, or as a blend value for anti-aliasing at the edges of the target object. Area scanning improves the statistical selection of pixels that are considered as part of the target object, eliminating isolated pixels that happen to be in the defined color space, and provides a factor indicative of where the pixel is relative to the edge of the target object for blending the edge of the color change.

Figure 3:
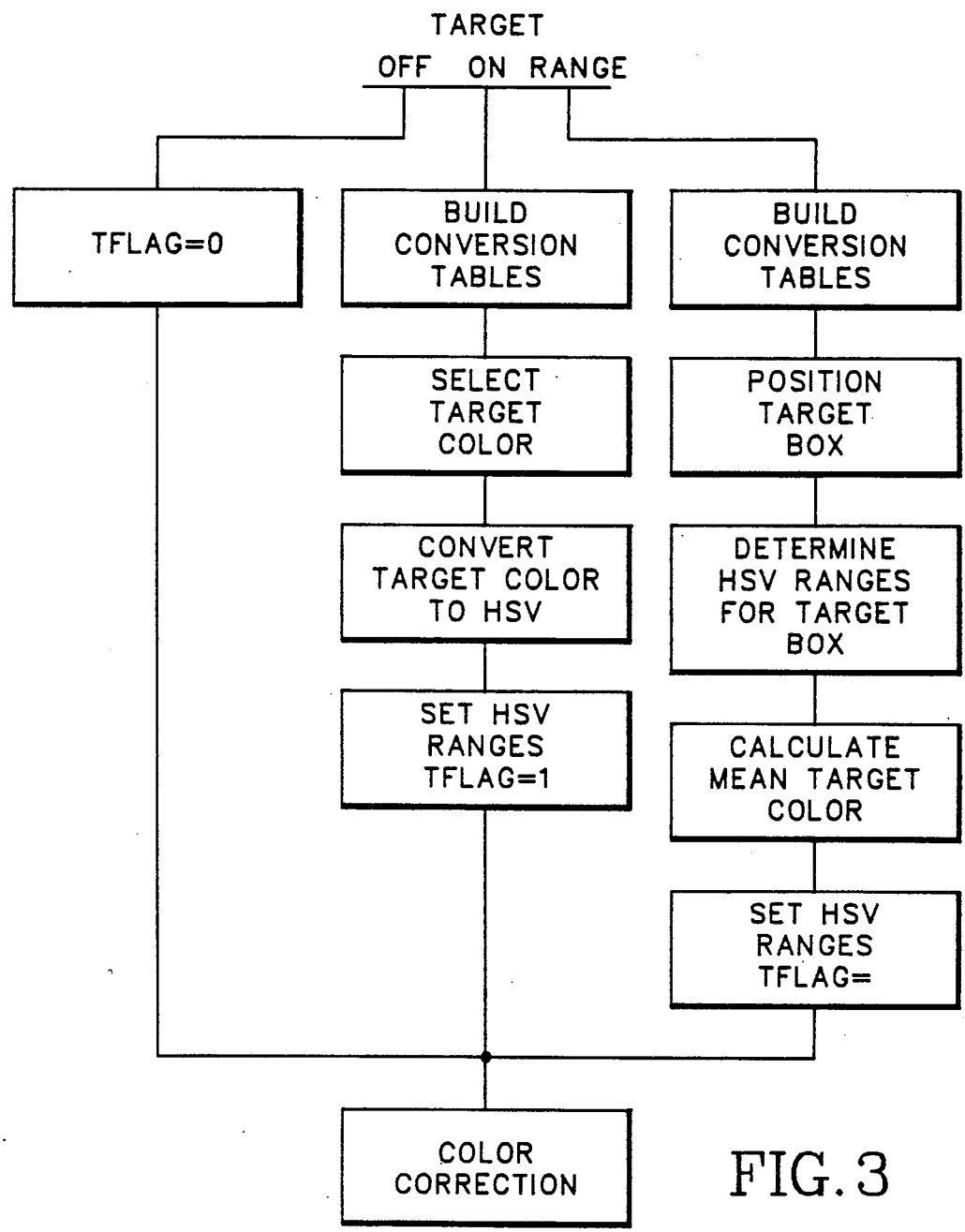
FIG. 3 is a flow chart diagram of a computer program to define the target object or color region for color correction.
Figure 4:
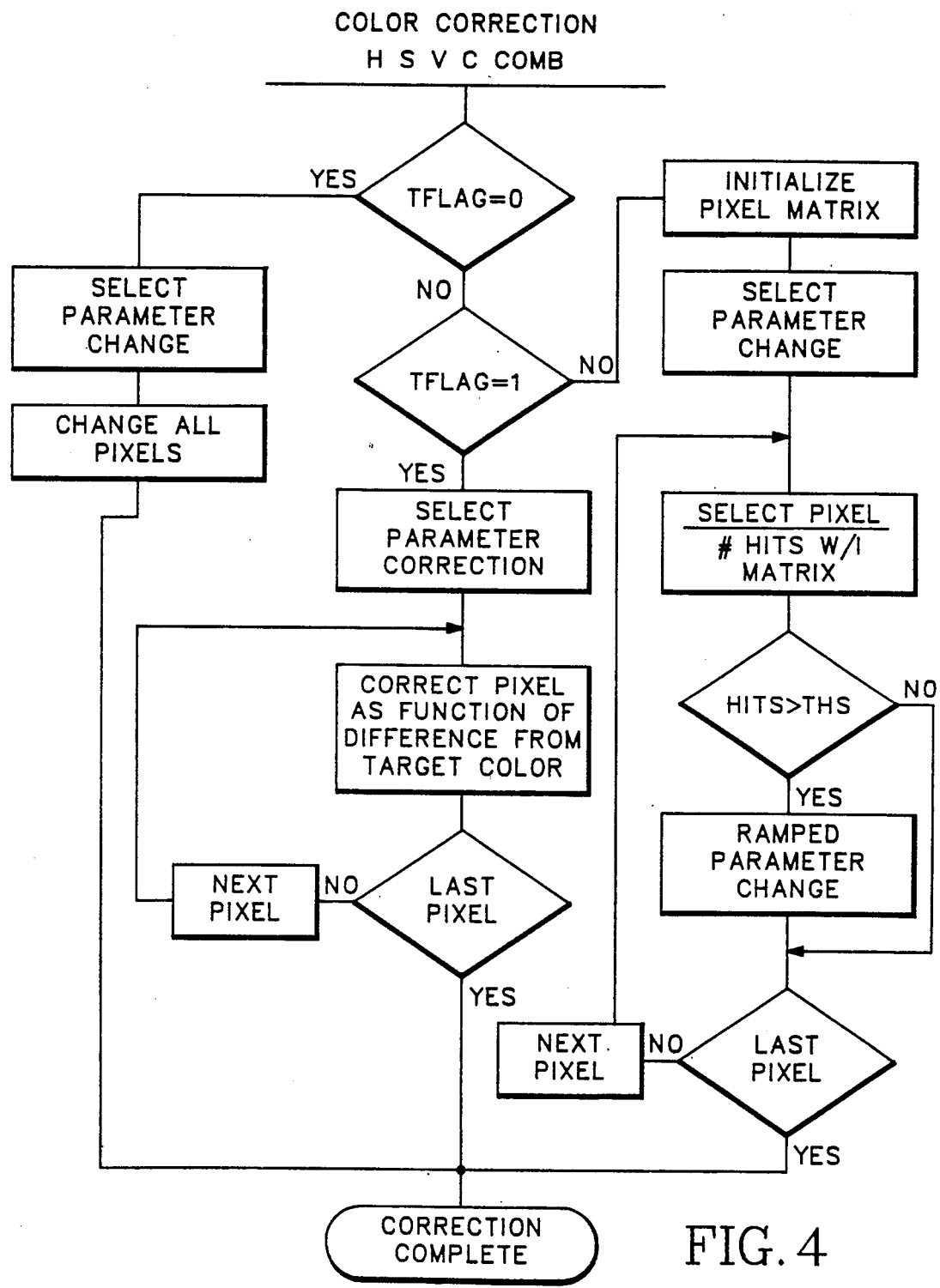
FIG. 4 is a flow chart diagram of a computer program to color correct target objects within the defined color region.

Referring now to FIGS. 3 and 4 an operator selects the desired mode of operation: target OFF, target ON or target RANGE. For target OFF a target flag TFLAG is set to zero and the color correction phase is entered. For target ON a target color is selected which includes a predetermined range about the selected target color, and the TFLAG is set to one before the color correction phase is entered. For target RANGE the operator positions a target box within a target object to be color corrected as shown on the display 26. The target box is sized and positioned to cover the widest range of colors included within the target object. For complex target objects a plurality of target boxes may be used to assure the best representation of the range of colors within the target object. Each pixel within the target box is scanned to determine the hue, saturation and luminance, or value, (HSV) parameters and each parameter is compared with respective limits. If a parameter is outside current limits, then the limits are extended. When all the pixels of all the target boxes for the target object have been scanned, a target mean color is calculated. The limits are then further extended by a predetermined amount and TFLAG is set to three prior to entering the correction phase.

In the correction phase one of five correction paths is selected by an operator: hue, saturation, luminance, contrast or combination. For each correction path the process is essentially the same. First TFLAG is checked to determine whether to follow a target OFF, a target ON or a target RANGE path. If TFLAG is zero, then the target OFF path is selected and all the pixels within the picture, or a physically defined portion of the picture, are corrected by an amount determined by the operator. For hue it would be rotation angle, for saturation it would be percent change, for luminance it would be level change, for contrast it would be percent change around an average luminance value, and for combination it would be any combination of the above.

If TFLAG is equal to one, then the target ON path is selected. A correction value for hue, saturation, luminance, contrast or combination thereof is selected. Each pixel within the defined physical boundaries of the picture is tested to determine whether it falls within the predetermined target limits, i.e., it is within the target object color space. For each pixel within the target object color space color correction is made.

Finally if TFLAG is neither zero nor one, then the target RANGE path is selected A bit map matrix is initiated, such as a 3×3 pixel map. The appropriate color change is selected and the appropriate parameter range(s) is determined. Each pixel within the physical boundaries of the picture is placed at the center of the bit map matrix together with its neighboring pixels to fill the matrix. For each pixel within the matrix a determination is made as to whether that pixel has a "hit", i.e., has HSV values which fall within the target object defined color space. The number of hits within the matrix is totaled and, if it exceeds a threshold value such as greater than two hits, then color correction is performed on the center, selected pixel. To provide anti-aliasing the amount of color correction applied is in the ratio of the number of hits to the total number of pixels within the matrix. This provides a smooth transition, or blending, at the edges of the target object.

For each color correction change maximum and minimum limits for each parameter are checked to assure that such limits are not exceeded. Therefore hue is limited to values between zero and 360 degrees of rotation, saturation is limited to values between minus one and 128 corresponding to zero and 100 percent, and luminance is limited to levels between minus one and 256 corresponding to BLACK and WHITE respectively.

Thus the present invention provides a means for color correcting a target object by automatically defining a region of color space for the target object, selecting the desired color change in either hue, saturation, luminance, contrast or combination thereof, and performing the color change by forming a pixel matrix about each pixel within a physically defined portion of a picture to determine how many pixels within the matrix fall in the region of color space, correcting the center pixel of the matrix accordingly.

What is claimed is:

1. A method for correcting the color of a target object within a color video picture having a plurality of picture elements comprising the steps of:
   defining automatically from a specified variable physical area of the target object a region of color space which encompasses the range of colors of the target object; and
   color correcting each picture element which lies within the defined region to a desired color,
   and wherein the color correcting step comprises:
   converting each picture element to corresponding digitized color parameters;
   comparing each color parameter of each picture element with the range of colors of the defined region to determine if the picture element is within the defined region; and
   changing a color parameter of each picture element determined to be within the defined region to achieve the desired color.

2. A method for correcting the color of a target object within a color video picture having a plurality of picture elements comprising the steps of:
   defining automatically from a specified variable physical area of the target object a region of color space which encompasses the range of colors of the target object; and
   color correcting each picture element that lies within the defined region as a function of a desired color and the number of neighboring picture elements that also lie within the defined region.

3. A method as recited in claim 2 wherein the color correcting step comprises:
   converting each picture element to corresponding digitized color parameters;
   scanning an area surrounding each picture element to generate a count of the number of picture elements within the area which lie within the defined region; and
   changing a color parameter of each picture element as a function of the count and the desired color.

4. A method as recited in claims 1 or 2 wherein the defining step comprises:
   positioning a target box within the target object, the target box being the specified variable physical area;
   converting the picture elements within the target box to corresponding digitized color parameters; and
   determining from the digitized color parameters for each picture element within the target box a range of values for each digitized color parameter, the range of values determining the defined region.

5. A method as recited in claim 4 further comprising the step of repeating the positioning, converting and determining steps to encompass a greater portion of the target object to extend the range of each color parameter.

6. A method as recited in claim 4 further comprising the step of expanding the range of each color parameter a predetermined amount.

7. A method as recited in claim 6 further comprising the step of repeating the positioning, converting and determining steps to encompass a greater portion of the target object to extend the range of each color parameter prior to the expanding step.

8. A method for correcting the color of a target object within a color video picture having a plurality of picture elements comprising the steps of:
   defining automatically from a specified variable physical area of the target object a region of color space which encompasses the range of colors of the target object; and
   color correcting each picture element which lies within the defined region to a desired color,
   and wherein the defining step comprises:
   positioning a target box within the target object, the target box being the specified variable physical area;
   converting the picture elements within the target box to corresponding digitized color parameters; and
   determining from the digitized color parameters for each picture element within the target box a range of values for each digitized color parameter, the range of values determining the defined region.

9. A method as recited in claim 8 further comprising the step of repeating the positioning, converting and determining steps to encompass a greater portion of the target object to extend the range of each color parameter.

10. A method as recited in claim 8 further comprising the step of expanding the range of each color parameter a predetermined amount.

11. A method as recited in claim 10 further comprising the step of repeating the positioning, converting and determining steps to encompass a greater portion of the target object to extend the range of each color parameter prior to the expanding step.

* * * * *